United States Patent Office 3,578,644
Patented May 11, 1971

3,578,644
HYDROXYL MODIFIED POLYBENZIMIDAZOLES
Floyd D. Trischler, San Diego, Calif., assignor to Whittaker Corporation, Los Angeles, Calif.
No Drawing. Filed Feb. 23, 1968, Ser. No. 707,422
Int. Cl. C08g 33/02
U.S. Cl. 260—78.4      8 Claims

ABSTRACT OF THE DISCLOSURE

This patent describes novel modified polybenzimidazoles having the following repeating unit

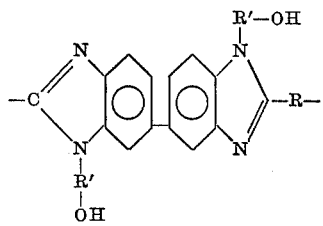

wherein R is a divalent aliphatic, cycloaliphatic or aromatic group; and R' is divalent aliphatic. This patent further describes the procedures for the preparation of these novel polymers and uses of these polymers.

BACKGROUND OF THE INVENTION

The present invention relates to the preparation of novel polybenzimidazole polymers and their various uses.

Various polybenzimidazole polymers have been prepared heretofore. In general, these polymers are of great value in the formation of laminates molded and cast articles and the like. However, these materials are generally hydrophobic if hydrophilic at all, only to a very limited extent. In any event, heretofore it has not been possible to wet a polybenzimidazole polymer with a hydrophilic solvent. The hydrophobic character of these polymers obviously serves to restrict or limit their utility particularly their suitability for uses involving wet films and the like. The present invention is, therefore, concerned with a novel class of stable polybenzimidazole polymers which are hydrophilic.

SUMMARY OF THE INVENTION

Briefly, the present invention comprises novel modified polybenzimidazole polymers having the following repeating unit

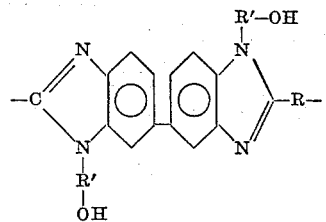

wherein R is a divalent aliphatic, cycloaliphatic or aromatic group; and R' is a divalent aliphatic group. Normally, R and R' contain from 1 to about 12 carbon atoms.

These polymers are prepared by reacting a polybenzimidazole polymer having the repeating unit

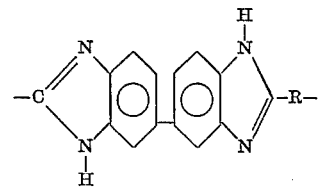

wherein R is as defined above; with an omega halo alkanol of the formula X—R'—OH; or an 1,2-alkylene oxide of the formula R'=O, in accordance with the following general reaction equation

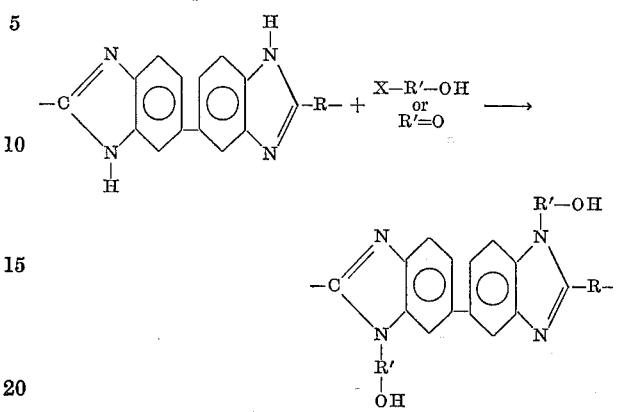

wherein R and R' are as defined above and X is halogen.

The polymers of this invention normally have molecular weights from about 1,000 to 100,000 or more.

Accordingly, it is an object of the present invention to provide a novel class of modified polybenzimidazole polymers.

More particularly, it is an object of the present invention to provide a novel class of polybenzimidazole polymers which are hydrophilic.

Yet another object of the present invention is to provide a novel method of preparing modified polybenzimidazole polymers.

Still another object of the present invention is the provision of hydroxy-modified polybenzimidazole polymers. These and other objects and advantages of the present invention will be apparent to those skilled in the art from the more detailed description which follows.

DESCRIPTION OF THE PREFERRED EMBODIMENTS

The polybenzimidazole starting materials utilized in the practice of the present invention are generally those described in assignee's copending U.S. pat. application Ser. No. 561,645, filed June 27, 1966, the disclosure of which is expressly incorporated herein by reference. The various reactants employed in the present invention, that is the polybenzimidazole polymers and the omega halo alkanols or 1,2-alkylene oxides are normally utilized in about stoichiometric amounts. The reaction temperatures are generally somewhat above room temperature in order to provide a reasonable rate of reaction. The preferred temperature is between 50° to 150° C. in the presence of sodium hydride or sodium t-butoxide as catalyst. However, it is entirely possible to run the reaction at temperatures as low as room temperatures. As will be apparent to those skilled in the art, the upper limit of the reaction temperature in the present invention is limited only by the need to avoid the cross-linking or opening of the imidazole rings, and thus the upper limit on the reactions employed in the present invention is normally on the order of about 300° C. In any event, it is to be understood that the proportions and reaction temperatures employed in the present invention are not critical.

The following examples are presented solely to illustrate the invention and should not be regarded as limiting in any way. In the examples, the parts and percentages are by weight unless otherwise indicated.

EXAMPLE I

Sebacic acid (202.2 g., 1.0 mole) and diaminobenzidine (214.3 g., 1.0 mole) were mixed at 210° to 232° C. for 2 hours, 20 minutes, followed by 1½ hours at 270° to 316° C. The inherent viscosity was 0.62 (0.5% in sulfuric acid).

EXAMPLE II

The polybenzimidazole prepared above (20.0 g.) was then dissolved in 200 ml. of dimethylacetamide. Sodium hydride (1.42 g.) was added and the solution mixed until the gas evolution ceased. Bromoethanol (3.62 g.) in 50 ml. of dimethylacetamide was added and the solution stirred overnight at room temperature, followed by two hours at 60°–70° C. After workup, the inherent viscosity of the polymer was 0.58 (0.5% in sulfuric acid). The oxygen content of the polymer was found to be 4.41% (theoretical=7.40%). This corresponds to approximately 60% reaction.

The properties of the hydroxyl containing polybenzimidazole is as follows:

| Polymer | Specific Resistance ohm-cm. | Water pick-up, percent | Resistance to 40% potassium hydroxide at 145° C. for 36 hrs. |
| --- | --- | --- | --- |
| Unmodified polymer | 16×10⁵ | 15 | Excellent. |
| Hydroxyl modified polymer | 81.2×10³ | 47½ | Do. |

As will be apparent in the foregoing example the basic sodium hydride is utilized as a catalyst or promoter for the reaction. However, any basic compound may be utilized in place of sodium hydride including sodium methoxide, sodium t-butoxide, sodium hydroxide or potassium hydroxide. Likewise, the invention is applicable not only to the use of bromoethanol, but other omega halo alkanols may be used including fluoroethanol, chloroethanol and iodoethanol. Suitable 1,2-alkylene oxide include ethylene oxide, 1,2-propylene oxide and 1,2-butylene oxide.

The novel hydrophilic polymers of the present invention are stable to hot concentrated potassium hydroxide solutions and have reduced electrical resistance. In addition, these novel polymers are useful as molding compounds, coatings and laminating resins. The fusibility and curing characteristics are quite similar to the polymers of Ser. No. 561,645, and the utility described therein is fully applicable to the polymers of the present invention.

Laminates can be prepared by impregnating glass cloth with a dimethylacetamide (DMAC) solution of the polymers of this invention, removing the DMAC, then fusing multiple layers of the "prepreg" in a press at 600° F. and 5000 p.s.i.

Coatings may be made by casting a DMAC solution of the polymers on a substrate such as aluminum, then removing the DMAC at 400° F. in an oven. Such films have excellent adhesion to aluminum and are extremely flexible.

Compression moldings can be prepared from the polymers by fusing the dried powdered polymer in a mold in a press at 600°–650° F. at 5000 to 10,000 p.s.i.

Having fully described the invention, it is intended that it be limited only by the lawful scope of the appended claims.

I claim:
1. Novel polybenzimidazole polymers having the repeating unit

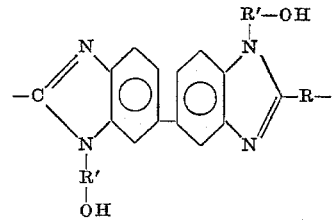

wherein R is a divalent aliphatic, cycloaliphatic or aromatic group; and R' is a divalent aliphatic group.
2. The polymers of claim 1 wherein R is alkylene.
3. The polymers of claim 1 wherein R' is alkylene.
4. The method of preparing novel polybenzimidazoles of the formula

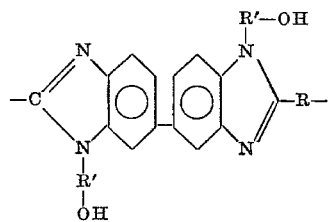

which comprises reacting a polybenzimidazole of the formula

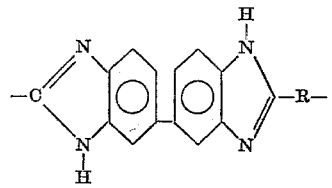

with a compound selected from the group consisting of omega halo alkanols and 1,2-alkylene oxides; wherein in the above formulae R is divalent aliphatic, cycloaliphatic or aromatic; and R' is divalent aliphatic.
5. The method of claim 4 wherein the reaction is carried out in the presence of a basic catalyst.
6. Moldings comprising the polymers of claim 1.
7. Coatings comprising the polymers of claim 1.
8. Laminates comprising the polymers of claim 1.

References Cited

UNITED STATES PATENTS 3,386,969   6/1968   LeVine _____ 260—78.4

JOSEPH L. SCHOFER, Primary Examiner

J. KIGHT, Assistant Examiner

U.S. Cl. X.R.

106—382; 117—161; 161—192; 260—32.6